J. EMMONS.
HONEY EXTRACTOR.
No. 179,651.  Patented July 11, 1876.
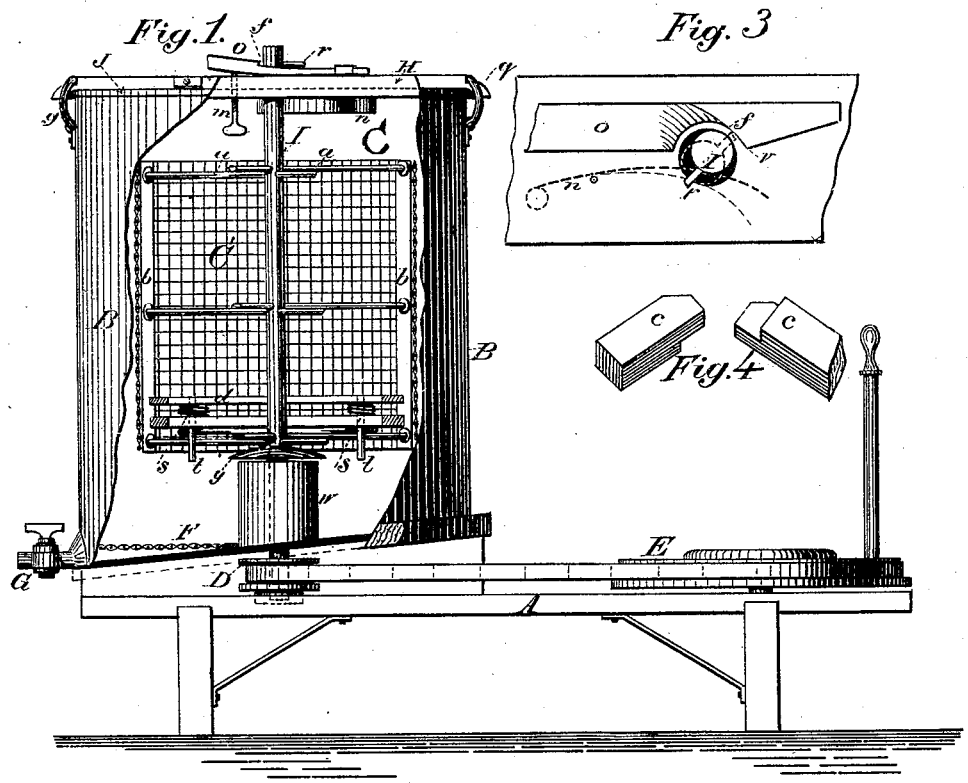
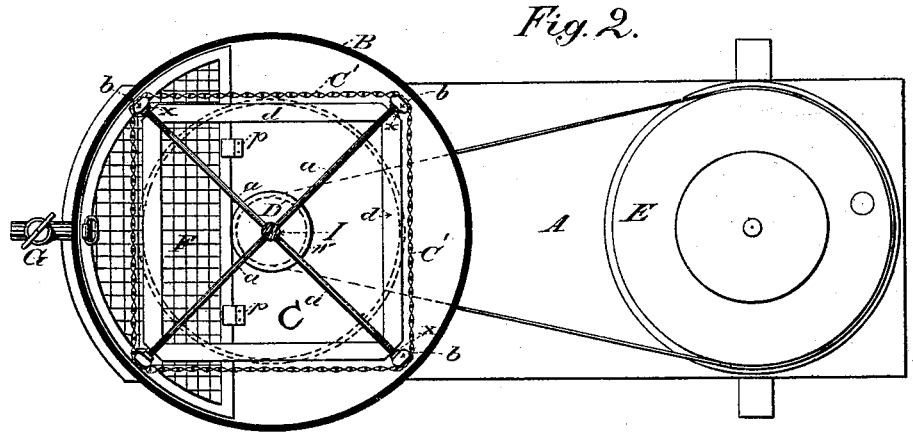
Attest:
W. W. Dodge
Donn Twitchell
Inventor:
Jacob Emmons,
by Dodge & Son
Attys

UNITED STATES PATENT OFFICE.

JACOB EMMONS, OF ST. GEORGE, KANSAS.

IMPROVEMENT IN HONEY-EXTRACTORS.

Specification forming part of Letters Patent No. 179,651, dated July 11, 1876; application filed April 28, 1876.

*To all whom it may concern:*

Be it known that I, JACOB EMMONS, of St. George, Pottawattamie county, Kansas, have invented a Honey-Extractor, of which the following is a specification:

My invention consists in a novel construction of honey-extractors, whereby the necessity of removing the caps from the cells of honey-comb by means of a knife is avoided, and the honey more quickly and cheaply removed, as hereinafter more fully explained.

In the drawing, Figure 1 represents a side view of my improved apparatus, a portion of the casing or can broken away to show the parts, the frame or receiver being also in section; Fig. 2, a top or plan view, showing the casing or can in cross-section; and Figs. 3 and 4, detail views of certain parts.

This invention relates to that class of honey-extractors in which the comb containing the honey is placed in a rotating frame, and the honey thrown out by centrifugal force, the comb being afterward placed in the hive to be refilled. Heretofore, however, it has been necessary to remove the caps from the cells of the honey-comb before placing it in the reel, in order to allow the honey to escape, this operation being usually performed by means of a long knife. To obviate the necessity of this operation is the first object of my invention.

In constructing my improved machine I provide a suitable frame or stand, A, on which is mounted a can or vessel, B, of circular form, the bottom of said vessel being inclined from the rear downward toward the front, as shown in Fig. 1, a cock or faucet, G, being placed at the lowest point, through which to draw off the honey. Vertically through the can or receiver B I extend a shaft, I, which rests loosely in a block or bearing, $l$, at its lower end in such manner as to permit a vertical movement of the same without its coming out of the said box or bearing. Extending radially from the shaft I are two or more series of arms, $a$, there being four in each series, said arms meeting each other at right angles, as shown in Fig. 2. These rods $a$ are provided at their outer ends with screw-threads and with nuts $x$, the ends of the rods entering holes in vertical strips or bars $b$. The parts being thus arranged, a wire-gauze casing, C', is placed around the frame so formed, the nuts $x$ being screwed in toward the shaft I, thereby allowing the strips or bars $b$ to be drawn in in the same direction, thus making the frame small enough to allow the wire-gauze casing to be easily slipped over the same, when the nuts are again screwed outward toward the ends of the rods, crowding the bars or strips $b$ outward, and thus tightening the casing C' on the frame. Across the top of the can or receiver B is extended a cross-bar, H, to which are hinged the lids J which cover the can, the bar H being provided midway between the ends with a hole through which passes the shaft I, said hole being somewhat larger than the shaft. On the lower end of the shaft I is a pulley, D, which receives motion from a driving-wheel, E, by means of a belt, as shown. Inside of the wire-gauze casing C', and resting on the lower series of rods $a$, or upon a wire spring running entirely around the inside of said casing, is mounted a frame composed of four strips, $c$, having their ends cut and lapped, as shown in Fig. 4. This frame rests at the four corners against the bars $b$, the corners of the frame being cut off, as shown in Figs. 2 and 4, for that purpose. On the upper side of this frame are spiral springs $s$, two or more on each of the strips $c$, on which springs are mounted a second series of strips, $d$, one of these falling directly above each of the strips $c$. The strips $d$ are made shorter than the strips $c$, and are free to move up and down, being kept in their proper position with reference to the casing C' by means of guide-rods $t$, as shown in Fig. 1. On the strips $d$ the honey-comb is placed in a vertical position, the face of the comb lying against the wire-gauze C'. As before mentioned, a cross-bar, H, extends across the top of the can or receiver B, this bar being held fast in place by hinged clasps $g$ locking over its ends, as shown in Fig. 1. On the under side of this bar is a spring, $n$, which bears against the vertical shaft I, thus tending to keep it against one side of the hole through which it passes in the same, which hole, as before stated, is larger than the shaft, as clearly shown in Fig. 3, the spring $n$ being there shown in dotted lines. On the upper side of the bar H is a spring-plate, $o$, placed with its face flat against that of the bar H, one end being fast and the other elevated or lowered by means of a set-screw, $m$, as shown in Fig. 1.

Projecting from the shaft I, at a point just above the bar H, is a pin, $r$, the object of which will be explained farther along.

As one end of the spring-plate O is fastened down flush with the face of the cross-bar H, and the other is elevated by the set-screw $m$, it is apparent that the upper face of this plate forms an incline. The plate O extends along close by the side of the hole in the bar H, through which the shaft I passes, at which point it is cut away, as shown in Fig. 3. The incline of the spring-plate O is unbroken until it reaches a point about opposite the center of said hole, at which point a shoulder, $f$, is formed running across the plate at an angle, as shown in Fig. 3.

The plate $o$ and the spring $n$ are placed on opposite sides of the shaft I, and consequently the shaft is forced over to that side of the hole in the bar H next to the plate $o$.

It will readily be seen that when the shaft I is made to revolve, the pin $r$ will ride upon the incline of the plate $o$, thus raising the shaft I and the frame which it carries vertically higher and higher until it comes around to the edge of the same, when it drops off, and the weight of the shaft and frame causes it to drop down until the pin comes in contact with the upper face of the plate H. This, it will be observed, gives a sudden jar to the frame, and also to the honey-comb contained therein; but as the comb is mounted on the springs, it will be seen that this jarring will cause it to rub up and down within the frame, and as the face of the comb lies against the wire-gauze, as before stated, this rubbing will cause an abrasion of the caps of the cells, and allow the honey to escape.

At the same time that the pin $r$ is riding up the incline, and for a short space after the pin has dropped off the plate $o$, the pin is in contact with the inclined shoulder $f$, which forces the shaft I back against the spring $n$ until the pin rides past the point $v$, when the spring $n$ suddenly throws it forward again, thus giving, in addition to the rotary and vertical motions, an oscillatory motion, which greatly aids in forcing the honey from the comb.

As it is necessary to pass the reel-shaft I through the bottom of the can or vessel B, it is of course necessary to provide some means of preventing the honey from escaping at that point. This is done by forming a collar, $w$, around this opening, and carrying the same up as high as the honey will ever be allowed to stand in the receiver; and, in order to prevent the honey from dropping through from the top, I provide the shaft I with a flange, $y$, projecting radially therefrom, somewhat larger in diameter than the collar $w$, said flange coming down close to the top of said collar, as shown in Fig. 1.

In order to prevent impurities or pieces of comb from passing through the cock or faucet G, I place a strainer, F, across the fore part of the bottom, as shown in Figs. 1 and 2, the forward edge resting against the can or vessel B, and the back edge under clamps $p$.

This arrangement permits the strainer F to be removed, in order to clean it and the can or vessel B.

By turning down the clasps $g$, and removing the belt from the pulleys D and E, the frame C and shaft I may be removed, thus leaving the can or vessel clear, and allowing it to be readily cleaned.

It is obvious that instead of securing the pulley D to the shaft I, it may be mounted in suitable bearings, and the end of the shaft I squared and fitted loosely in a corresponding-shaped socket in the upper face of said pulley. This arrangement will obviate the necessity of removing the belt from the pulley D and driving-wheel E, when it is desired to remove the frame C, and will also allow the collar $w$ to be made much smaller, as in that case the pulley D will not need to pass through the same in removing and replacing the frame.

Having thus described my invention, what I claim is—

1. The rotating frame C, constructed and arranged to operate substantially as described, whereby there is imparted to the same a rotating and at the same time a vertically and also a horizontally-reciprocating motion, as and for the purpose set forth.

2. The comb-supporting bars $d$, supported on springs $s$, substantially as shown and described.

3. The rotating frame C, having its arms $a$ provided with screw-threads, and nuts $x$, for adjusting the uprights $b$ and tightening the wire-gauze C′, as set forth.

JACOB EMMONS.

Witnesses:
C. B. SMITH,
ELIAS SHULL.